United States Patent
Spitzer et al.

(10) Patent No.: US 12,043,244 B2
(45) Date of Patent: Jul. 23, 2024

(54) ZERO WEIGHT BATTERY CHARGER FOR HYBRID ELECTRIC VEHICLES

(71) Applicant: Ampaire, Inc., Hawthorne, CA (US)

(72) Inventors: Jeffrey Spitzer, Hawthorne, CA (US); James Lawson, Hawthorne, CA (US)

(73) Assignee: Ampaire, Inc., Hawthorne, CA (US)

( * ) Notice: Subject to any disclaimer, the term of this patent is extended or adjusted under 35 U.S.C. 154(b) by 402 days.

(21) Appl. No.: 17/378,389

(22) Filed: Jul. 16, 2021

(65) Prior Publication Data
US 2023/0012569 A1   Jan. 19, 2023

(51) Int. Cl.
| | |
|---|---|
| H02P 25/18 | (2006.01) |
| B60K 6/24 | (2007.10) |
| B60K 6/26 | (2007.10) |
| B60K 6/28 | (2007.10) |
| B60W 20/10 | (2016.01) |
| B64C 11/30 | (2006.01) |
| B64C 11/44 | (2006.01) |
| B64D 27/24 | (2006.01) |
| B64D 31/02 | (2006.01) |
| H02P 27/06 | (2006.01) |
| B64D 27/02 | (2006.01) |

(52) U.S. Cl.
CPC ............... *B60W 20/10* (2013.01); *B60K 6/24* (2013.01); *B60K 6/26* (2013.01); *B60K 6/28* (2013.01); *B64C 11/303* (2013.01); *B64C 11/44* (2013.01); *B64D 27/24* (2013.01); *B64D 31/02* (2013.01); *H02P 27/06* (2013.01); *B60Y 2200/50* (2013.01); *B60Y 2200/92* (2013.01); *B64D 27/026* (2024.01)

(58) Field of Classification Search
CPC .......... B60W 20/10; B60K 6/24; B60K 6/26; B60K 6/28; B64C 11/303; B64C 11/44; B64D 27/24; B64D 31/02; H02P 27/06
See application file for complete search history.

(56) References Cited

U.S. PATENT DOCUMENTS

| | | | |
|---|---|---|---|
| 5,281,094 A * | 1/1994 | McCarty | B64C 11/44 318/722 |
| 7,956,563 B2 * | 6/2011 | Perisic | B60L 58/40 318/400.41 |
| 10,063,180 B2 * | 8/2018 | Wang | B60L 15/007 |
| 11,114,969 B2 * | 9/2021 | Ohashi | H02H 7/0838 |

(Continued)

OTHER PUBLICATIONS

International Search Report and Written Opinion for Application No. PCT/US2022/037394, mailed on Oct. 6, 2022, 17 pages.

(Continued)

*Primary Examiner* — Gonzalo Laguarda

(57) ABSTRACT

A propulsion system for a hybrid electric vehicle comprises a traction motor having first and second stator windings; a power source having a DC power output coupled to the first windings; a battery having a DC power output coupled to the second windings; and a controller to independently control: (i) a first power level output at the first DC power output, and (ii) a second power level of motive power output by the traction motor; wherein responsive to a signal to set the second power level less than full capacity of the traction motor, the controller provides a power difference between the first and second power levels from the second windings to the battery.

20 Claims, 6 Drawing Sheets

(56) References Cited

U.S. PATENT DOCUMENTS

| | | | | |
|---|---|---|---|---|
| 2006/0020383 A1* | 1/2006 | Betz | ........................ | B60K 6/46 |
| | | | | 701/50 |
| 2013/0264981 A1* | 10/2013 | Taniguchi | .............. | B62D 5/046 |
| | | | | 318/400.26 |
| 2020/0148373 A1* | 5/2020 | Long | ....................... | F01D 15/10 |
| 2020/0381984 A1* | 12/2020 | Sercombe | .............. | H02K 11/21 |

OTHER PUBLICATIONS

International Preliminary Report on Patentability for Application No. PCT/US2022/037394, mailed on Jan. 25, 2024, 11 pages.

* cited by examiner

500 ↘

```
┌─────────────────────────────────────┐
│ Responsive to receiving signals from a control │
│ interface of a hybrid electric vehicle, │
│ independently controlling: (i) a first power level │
│ of electric power output at a direct current (DC) │
│ power output of a power source of the hybrid │
│ electric vehicle, the power source electrically │
│ coupled by a first inverter to first stator │
│ windings of a traction motor of the hybrid │
│ electric vehicle, the power source comprising a │
│ generator, and (ii) a second power level of │
│ motive power output by the traction motor. │
│ 502 │
└─────────────────────────────────────┘
                  ↓
┌─────────────────────────────────────┐
│ Responsive to receiving a signal to set the │
│ second power level at less than a full capacity │
│ of the traction motor, causing a power │
│ difference between the first power level and │
│ the second power level to be provided from │
│ second stator windings of the traction motor │
│ through a second inverter to a battery of the │
│ hybrid electric vehicle. │
│ 504 │
└─────────────────────────────────────┘
                  ↓
┌─────────────────────────────────────┐
│ Responsive to the power difference between │
│ the first power level and the second power │
│ level exceeding a capacity of the battery to │
│ absorb power, reducing the first power level of │
│ electric power output at the power output of a │
│ generator of the hybrid electric vehicle. │
│ 506 │
└─────────────────────────────────────┘
```

ZERO WEIGHT BATTERY CHARGER FOR HYBRID ELECTRIC VEHICLES

DESCRIPTION OF RELATED ART

The disclosed technology relates to hybrid electric vehicles.

SUMMARY

In general, one aspect disclosed features an propulsion system for a hybrid electric vehicle, comprising: a traction motor having first stator windings and second stator windings; a power source having a first direct current (DC) power output, the power source comprising a generator; a battery having a second DC power output; a first inverter electrically coupled between the first DC power output of the power source and the first stator windings; a second inverter electrically coupled between the second DC power output of the battery and the second stator windings; and a controller configured to independently control: (i) a first power level of electric power output at the power output of the power source, and (ii) a second power level of motive power output by the traction motor; wherein responsive to receiving a signal to set the second power level at less than a full capacity of the traction motor, the controller is configured to provide a power difference between the first power level and the second power level from the second stator windings through the second inverter to the battery; and wherein responsive to the power difference between the first power level and the second power level exceeding a capacity of the battery to absorb power, the controller is configured to reduce the first power level of electric power output at the power output of the generator.

Embodiments of the propulsion system may include one or more of the following features. Some embodiments comprise a control interface, wherein the controller is further configured to independently control the first power level and the second power level responsive to signals received from the control interface. In some embodiments, the second inverter is a four-quadrant inverter. In some embodiments, the power source comprises: an engine having a mechanical power output, wherein the generator has (i) an electrical power output and (ii) a mechanical power input, the mechanical power input mechanically coupled to the mechanical power output of the engine; and a rectifier having (i) an electrical power input electrically coupled to the electrical power output of the generator and (ii) an electrical power output electrically coupled to the DC power output of the power source. In some embodiments, the engine is a combustion engine. In some embodiments, the hybrid electric vehicle is an aircraft. Some embodiments comprise a variable-pitch propeller; and a governor configured to control a pitch of the variable-pitch propeller; wherein the controller is further configured to control the governor responsive to signals received from the control interface. In some embodiments, the hybrid electric vehicle is an automobile.

In general, one aspect disclosed features a propulsion system for a hybrid electric vehicle, further comprising: a traction motor having first stator windings and second stator windings; a power source having a first direct current (DC) power output, the power source comprising a generator; a battery having a second DC power output; a first inverter electrically coupled between the first DC power output of the power source and the first stator windings; a second inverter electrically coupled between the second DC power output of the battery and the second stator windings; one or more hardware processors; and a non-transitory machine-readable storage medium encoded with instructions executable by the hardware processor to perform operations comprising: responsive to receiving signals from a control interface, independently controlling: (i) a first power level of electric power output at the power output of the power source, and (ii) a second power level of motive power output by the traction motor; responsive to receiving a signal to set the second power level at less than a full capacity of the traction motor, providing a power difference between the first power level and the second power level from the second stator windings through the second inverter to the battery; and responsive to the power difference between the first power level and the second power level exceeding a capacity of the battery to absorb power, reducing the first power level of electric power output at the power output of the generator.

Embodiments of the propulsion system may include one or more of the following features. Some embodiments comprise a control interface, wherein the controller is further configured to independently control the first power level and the second power level responsive to signals received from the control interface. In some embodiments, the second inverter is a four-quadrant inverter. In some embodiments, the power source comprises: an engine having a mechanical power output, wherein the generator has (i) an electrical power output and (ii) a mechanical power input, the mechanical power input mechanically coupled to the mechanical power output of the engine; and a rectifier having (i) an electrical power input electrically coupled to the electrical power output of the generator and (ii) an electrical power output electrically coupled to the DC power output of the power source. In some embodiments, the engine is a combustion engine. In some embodiments, the hybrid electric vehicle is an aircraft. Some embodiments comprise a variable-pitch propeller; and a governor configured to control a pitch of the variable-pitch propeller; wherein the controller is further configured to control the governor responsive to signals received from the control interface. In some embodiments, the hybrid electric vehicle is an automobile.

In general, one aspect disclosed features a non-transitory machine-readable storage medium encoded with instructions executable by a hardware processor of a computing component, the machine-readable storage medium comprising instructions to cause the hardware processor to perform operations comprising: responsive to receiving signals from a control interface of a hybrid electric vehicle, independently controlling: (i) a first power level of electric power output at a direct current (DC) power output of a power source of the hybrid electric vehicle, the power source electrically coupled by a first inverter to first stator windings of a traction motor of the hybrid electric vehicle, the power source comprising a generator, and (ii) a second power level of motive power output by the traction motor; responsive to receiving a signal to set the second power level at less than a full capacity of the traction motor, providing a power difference between the first power level and the second power level from second stator windings of the traction motor through a second inverter to a battery of the hybrid electric vehicle; and responsive to the power difference between the first power level and the second power level exceeding a capacity of the battery to absorb power, reducing the first power level of electric power output at the power output of a generator of the hybrid electric vehicle.

Embodiments of the non-transitory machine-readable storage medium may include one or more of the following features. In some embodiments, the hybrid electric vehicle is an aircraft. In some embodiments, the operations further comprise: responsive to the signals received from the control interface, controlling a governor configured to control a pitch of a variable-pitch propeller of the aircraft. In some embodiments, the hybrid electric vehicle is an automobile.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 is a flowchart illustrating a process for controlling a propulsion system of a hybrid electric vehicle according to some embodiments of the disclosed technologies.

The figures are not exhaustive and do not limit the present disclosure to the precise form disclosed.

DETAILED DESCRIPTION

Hybrid electric aircraft employ both combustion and electric power to drive the propulsion system. These aircraft have several significant advantages over typical combustion-powered aircraft. For example, the emissions (especially on takeoff) and noise pollution of a hybrid electric aircraft are significantly reduced compared to a combustion-powered aircraft.

In due course it is expected that most if not all airports will be equipped with charging infrastructure for charging the batteries of electric and hybrid electric aircraft. But until this occurs there is a need for an on-board battery charging capability. Current solutions feature a separate on-board battery charger, with its attendant costs and additional weight. A typical on-board charger weighs approximately TBD pounds per kilowatt of charging capacity. The addition of such a charger therefore reduces the payload capacity of the aircraft. Especially in smaller aircraft, this represents a significant drawback.

Figure 1:
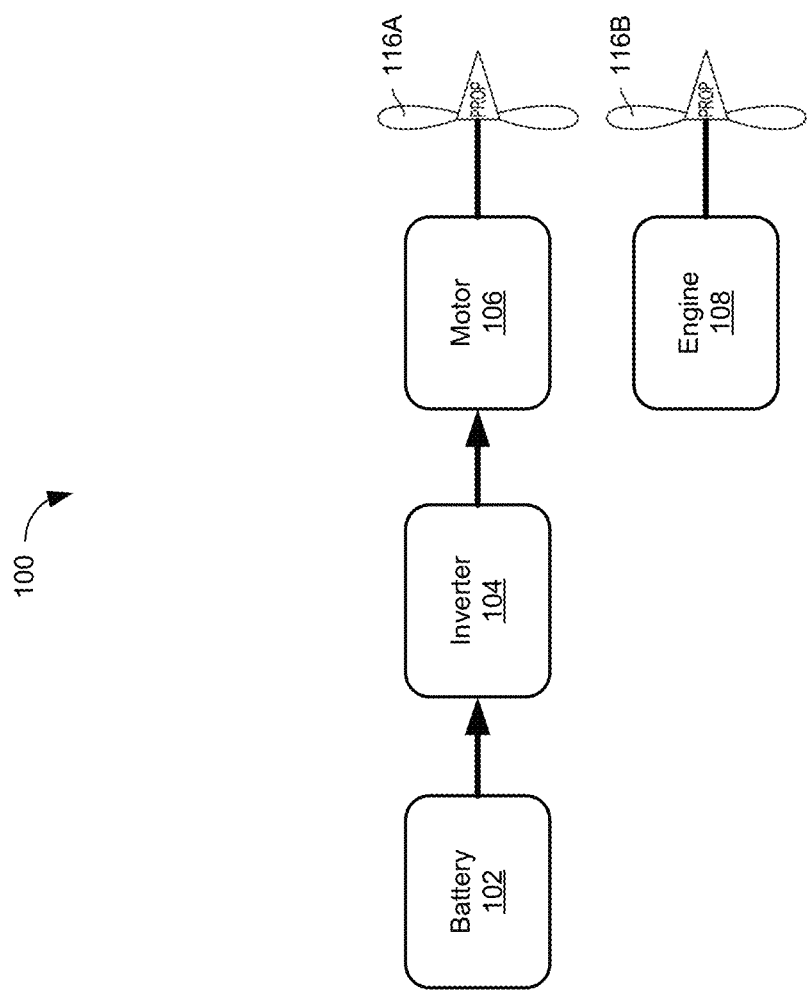
FIG. 1 illustrates a prior art independent parallel hybrid electric aircraft architecture.

Several hybrid electric aircraft architectures exist. FIG. 1 illustrates a prior art independent hybrid electric aircraft architecture 100. This architecture features two independent electric and combustion power trains, each driving a separate propeller. The electric power train includes a battery 102, an inverter 104, a motor 106 powered by the battery 102, and a first propeller 116A driven by the motor 106. The combustion power train includes a combustion engine 108 driving a second propeller 116B. The independent hybrid electric aircraft architecture 100 features an efficient method of connecting the power produced by combustion to the propeller. However, this architecture requires a ground charging infrastructure to charge the battery 102.

Figure 2:
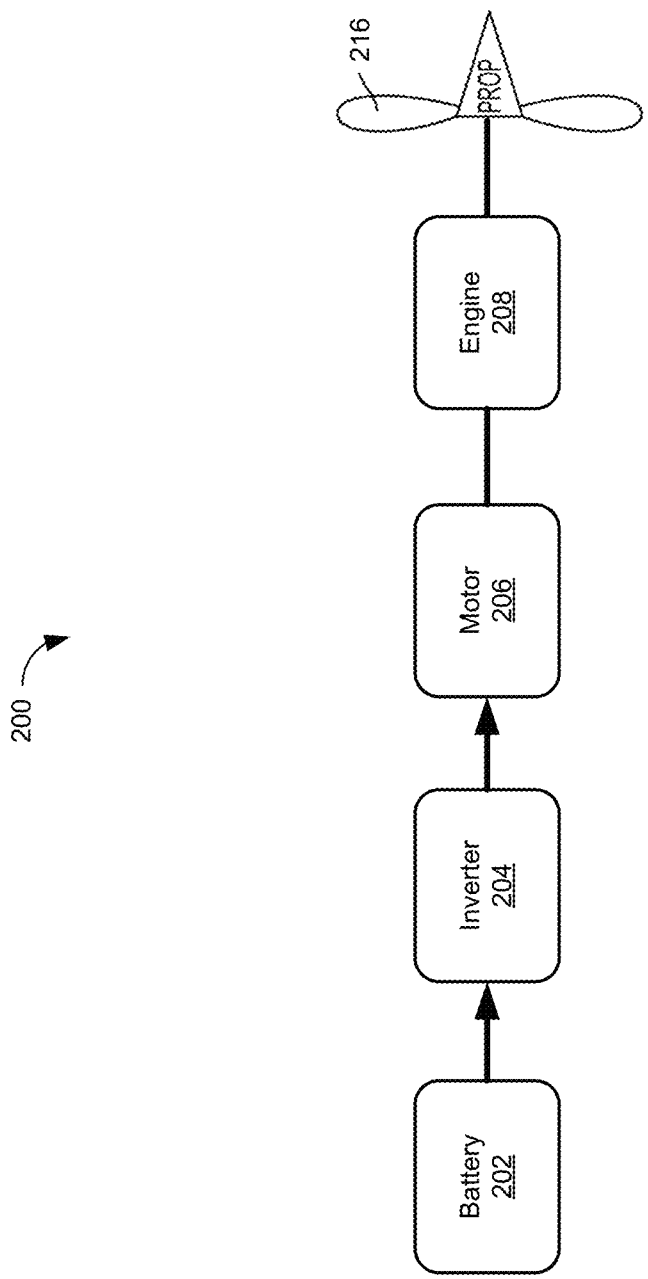
FIG. 2 illustrates a prior art integrated parallel hybrid electric aircraft architecture.

FIG. 2 illustrates a prior art integrated parallel hybrid electric aircraft architecture 200. This architecture features a single power train that includes a battery 202, an inverter 204, a motor 206 powered by the battery 202, a combustion engine 208, and a single propeller 216 driven by the motor 206 and the combustion engine 208. Like the independent hybrid electric aircraft architecture 100, the integrated parallel hybrid electric aircraft architecture 200 features an efficient method of connecting the power produced by combustion to the propeller. And like the independent hybrid electric aircraft architecture 100, the integrated parallel hybrid electric aircraft architecture 200 requires a ground charging infrastructure to charge the battery 102. The integrated parallel hybrid electric aircraft architecture 200 is also more mechanically challenging to fabricate.

Figure 3:
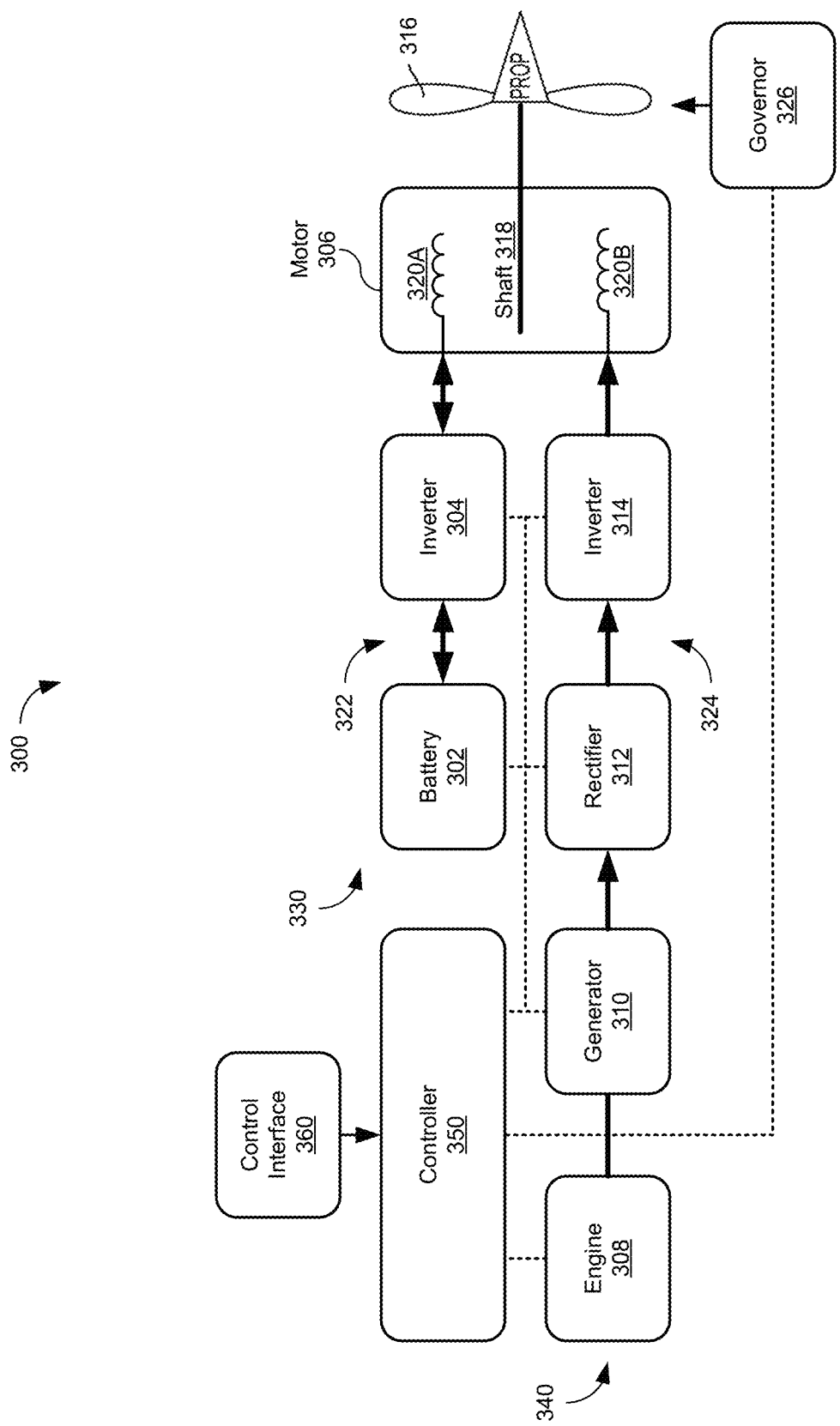
FIG. 3 illustrates a hybrid electric aircraft propulsion system having a series hybrid electric architecture according to some embodiments of the disclosed technologies.

FIG. 3 illustrates a hybrid electric aircraft propulsion system 300 having a series hybrid electric architecture according to some embodiments of the disclosed technologies. While the disclosed technologies are described with reference to hybrid electric aircraft, It should be understood by those skilled in the relevant arts that these technologies may be applied to any hybrid electric vehicle or vessel.

Referring to FIG. 3, the architecture 300 may feature a traction motor 306 having at least two sets of independent stator windings 320A,B. An electric power train 330 may drive one set of stator windings 320A. A power source in the form of a combustion power train 340 may drive the other set of stator windings 320B. In other embodiments, other power sources may drive stator windings 320B. Either or both of the stator windings 320 may cooperate with rotating magnets fixed onto a propeller shaft 318, to create torque and thereby turn one or more propellers 316 of the aircraft. The rotating magnets may be permanent magnets or electromagnets.

The combustion power train 340 may include a combustion engine 308 having a mechanical power output to drive a generator 310 having an AC power output. The combustion power train 340 may include a rectifier 312 that converts the AC output of the generator 310 to DC for transmission over a first DC bus 324. The combustion power train 340 may include an inverter 314 to convert the DC power to AC for driving the stator winding 320B. The electric power train 330 may include a battery 302 having a direct current (DC) power output that provides DC power for transmission over a second DC bus 322. The electric power train 330 may include an inverter 304 to convert the DC power to alternating current (AC) for driving the stator winding 320A.

The architecture 300 may include a controller 350 to control the operation of components of the propulsion system 300 in accordance with commands or control signals received from control interface 360. Through the control interface 360 and the controller 350, an operator may independently control (i) a first power level of electric power output at the power output of the combustion power train 340, and (ii) a second power level of motive power output by the traction motor 306. The controller 350 may control the combustion power train 340 by controlling one or more of the battery 302, the combustion engine 308, the generator 310, the rectifier 312, and the inverters 304 and 314, as indicated by the broken lines in FIG. 3. When the propeller 316 is a variable-pitch propeller, the controller may control a governor 326 of the propeller 316. When the propeller 316 is a fixed-pitch propeller, no governor 326 is needed.

While the combustion power train 340 typically has power flow in only one direction, the electric power train 330 has bidirectional power flow. The rotation of the magnets on the shaft 318 of the motor 306 may induce an AC voltage in the windings 320A, and the inverter 304 may convert that AC voltage into a DC voltage to charge the battery 302 over the second DC bus 322. In some embodiments, the inverter 304 may be implemented as a four-quadrant inverter or a similar inverter to enable this bidirectional operation.

In some embodiments, the number of turns may differ between the two sets of stator windings 320A,B. These embodiments may allow the different power trains 330, 340 to operate at different voltages, and may provide advantages in controlling the charging of the battery 302 from the motor 306.

Figure 4:
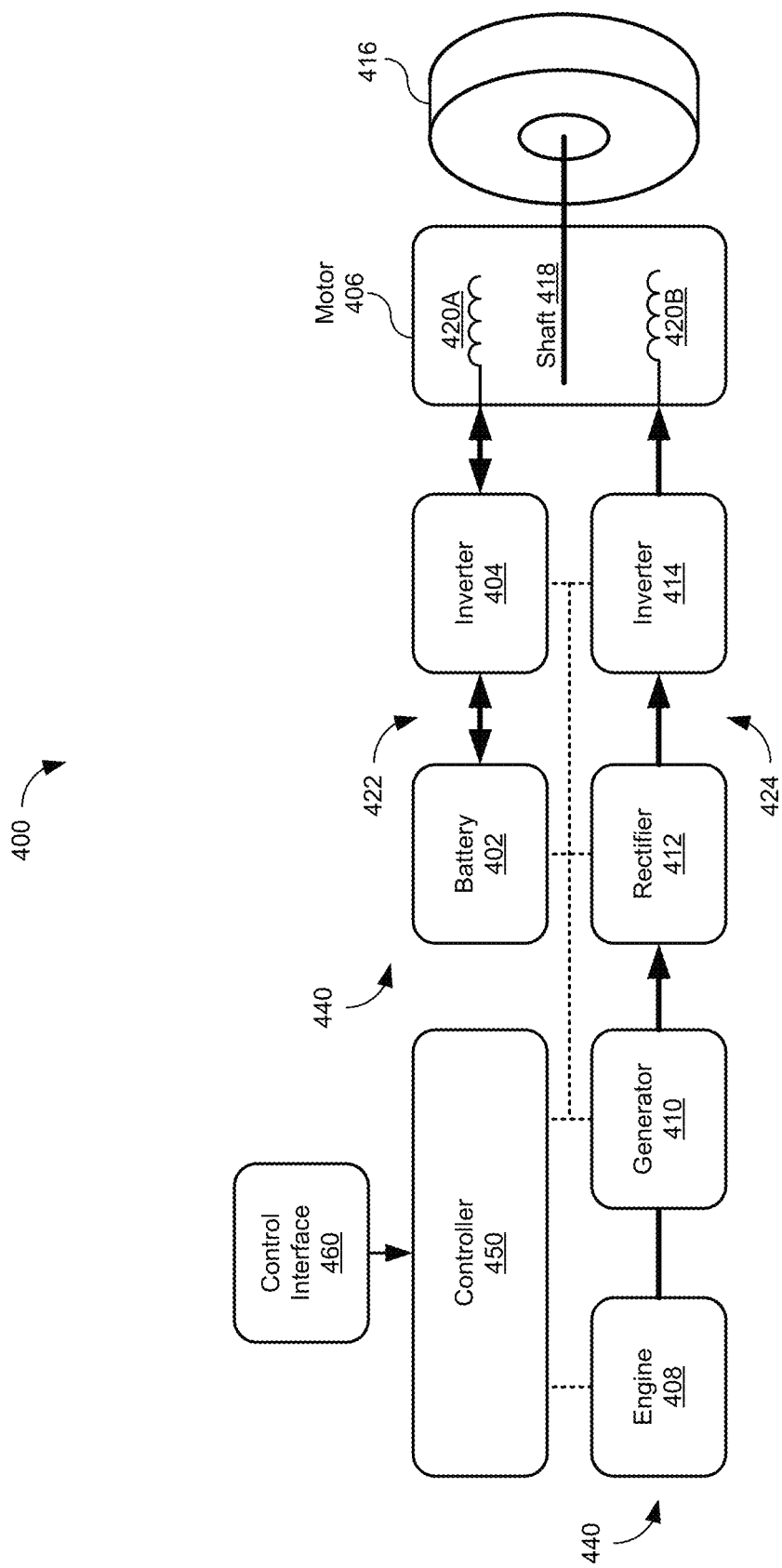
FIG. 4 illustrates a hybrid electric automobile propulsion system having a series hybrid electric architecture according to some embodiments of the disclosed technologies.

As noted above, the disclosed technologies may be applied to any electric vehicle or vessel. FIG. 4 illustrates a hybrid electric automobile propulsion system 400 having a series hybrid electric architecture according to some embodiments of the disclosed technologies.

Referring to FIG. 4, the architecture 400 may features a traction motor 406 having at least two sets of independent stator windings 420A,B. An electric power train 430 may drive one set of stator windings 420A. A power source in the form of a combustion power train 440 may drive the other set of stator windings 420B. In other embodiments, other power sources may drive stator windings 420B. Either or both of the stator windings 420 may cooperate with rotating magnets fixed onto a drive shaft 418, to create torque and thereby turn one or more wheels 416 of the automobile.

The combustion power train 440 may include a combustion engine 408 having a mechanical power output to drive a generator 410 having an AC power output. The combustion power train 440 may include a rectifier 412 that converts the AC output of the generator 410 to DC for transmission over a first DC bus 424. The combustion power train 440 may include an inverter 414 to convert the DC power to AC for driving the stator winding 420B. The electric power train 430 may include a battery 402 having a direct current (DC) power output that provides DC power for transmission over a second DC bus 422. The electric power train 430 may include an inverter 404 to convert the DC power to alternating current (AC) for driving the stator winding 420A.

The architecture 400 may include a controller 450 to control the operation of components of the propulsion system 400 in accordance with commands or control signals received from control interface 460. Through the control interface 460 and the controller 450, an operator may independently control (i) a first power level of electric power output at the power output of the combustion power train 440, and (ii) a second power level of motive power output by the traction motor 406. The controller 450 may control the combustion power train 440 by controlling one or more of the battery 402, the combustion engine 408, the generator 410, the rectifier 412, and the inverters 404 and 414, as indicated by the broken lines in FIG. 4.

While the combustion power train 440 typically has power flow in only one direction, the electric power train 430 has bidirectional power flow. The rotation of the magnets attached to the shaft 418 of the motor 406 may induce an AC voltage in the windings 420A, and the inverter 404 may convert that AC voltage into a DC voltage to charge the battery 402 over the second DC bus 422. In some embodiments, the inverter 404 may be implemented as a four-quadrant inverter or a similar inverter to enable this bidirectional operation.

In some embodiments, the number of turns may differ between the two sets of stator windings 420A,B. These embodiments may allow the different power trains 430, 440 to operate at different voltages, and may provide advantages in controlling the charging of the battery 402 from the motor 406.

FIG. 5 is a flowchart illustrating a process 500 for controlling a propulsion system of a hybrid electric vehicle according to some embodiments of the disclosed technologies. The elements of the process 500 are presented in one arrangement. However, it should be understood that one or more elements of the process may be performed in a different order, in parallel, omitted entirely, and the like. Furthermore, the process 500 may include other elements in addition to those presented. For example, the process 500 may include error-handling functions if exceptions occur, and the like.

Referring to FIG. 5, the process 500 may include, responsive to receiving signals from a control interface of a hybrid electric vehicle, independently controlling: (i) a first power level of electric power output at a direct current (DC) power output of a power source of the hybrid electric vehicle, the power source electrically coupled by a first inverter to first stator windings of a traction motor of the hybrid electric vehicle, the power source comprising a generator, and (ii) a second power level of motive power output by the traction motor, at 502. In the example of FIG. 3, the signals may be generated by the control interface 360, and in response to the signals, the controller 350 may control the combustion power train 340 and governor 326 as described above. In the example of FIG. 4, the signals may be generated by the control interface 460, and in response to the signals, the controller 450 may control the combustion power train 440 as described above.

Referring again to FIG. 5, the process 500 may include, responsive to receiving a signal to set the second power level at less than a full capacity of the traction motor, causing a power difference between the first power level and the second power level to be provided from second stator windings of the traction motor through a second inverter to a battery of the hybrid electric vehicle, at 504. In the example of FIG. 3, the power is provided from the stator windings 320A to the battery 302 through the inverter 304. In the example of FIG. 4, the power is provided from the stator windings 420A to the battery 402 through the inverter 404.

Referring again to FIG. 5, the process 500 may include, responsive to the power difference between the first power level and the second power level exceeding a capacity of the battery to absorb power, reducing the first power level of electric power output at the power output of a generator of the hybrid electric vehicle, at 506. In the example of FIG. 3, the power may be reduced by controlling the combustion engine 308 and/or the generator 310. In the example of FIG. 4, the power may be reduced by controlling the combustion engine 408 and/or the generator 410.

Figure 6:
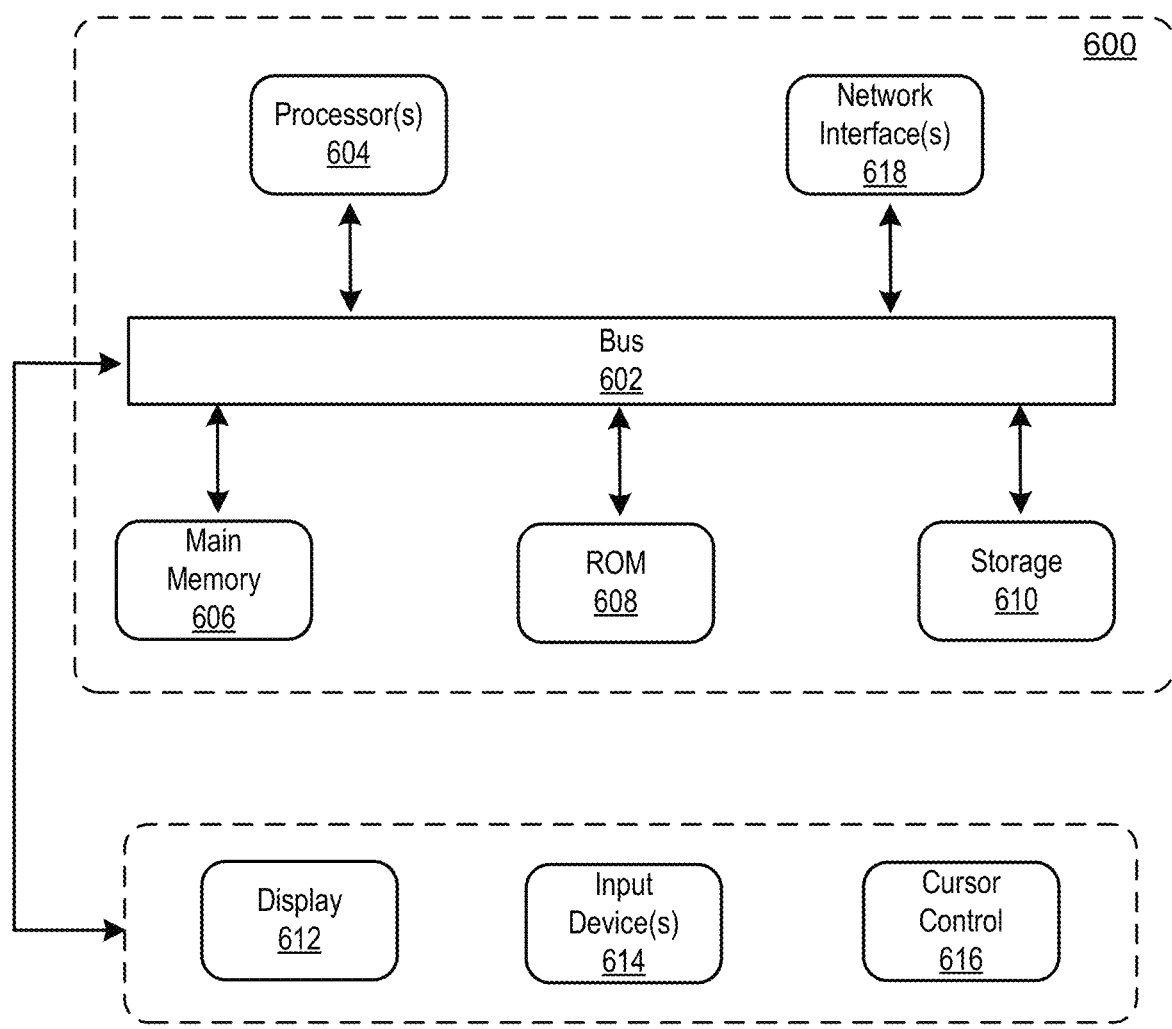
FIG. 6 is an example computing component that may be used to implement various features of embodiments described in the present disclosure.

FIG. 6 depicts a block diagram of an example computer system 600 in which embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or a WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A propulsion system for a hybrid electric vehicle, comprising:
    a traction motor having first stator windings and second stator windings;
    a power source having a first direct current (DC) power output, the power source comprising a generator;
    a battery having a second DC power output;
    a first inverter electrically coupled between the first DC power output of the power source and the first stator windings;
    a second inverter electrically coupled between the second DC power output of the battery and the second stator windings; and
    a controller configured to independently control:
        (i) a first power level of electric power output at the power output of the power source, and
        (ii) a second power level of motive power output by the traction motor;
    wherein responsive to receiving a signal to set the second power level at less than a full capacity of the traction motor, the controller is configured to provide a power difference between the first power level and the second power level from the second stator windings through the second inverter to the battery; and
    wherein responsive to the power difference between the first power level and the second power level exceeding a capacity of the battery to absorb power, the controller is configured to reduce the first power level of electric power output at the power output of the generator.

2. The propulsion system for a hybrid electric vehicle of claim 1, further comprising:
    a control interface, wherein the controller is further configured to independently control the first power level and the second power level responsive to signals received from the control interface.

3. The propulsion system for a hybrid electric vehicle of claim 1, wherein:
    the second inverter is a four-quadrant inverter.

4. The propulsion system for a hybrid electric vehicle of claim 1, wherein the power source further comprises:
    an engine having a mechanical power output, wherein the generator has (i) an electrical power output and (ii) a mechanical power input, the mechanical power input mechanically coupled to the mechanical power output of the engine; and
    a rectifier having (i) an electrical power input electrically coupled to the electrical power output of the generator and (ii) an electrical power output electrically coupled to the DC power output of the power source.

5. The propulsion system for a hybrid electric vehicle of claim 4, wherein:
    the engine is a combustion engine.

6. The propulsion system for a hybrid electric vehicle of claim 1, wherein:
    the hybrid electric vehicle is an aircraft.

7. The propulsion system for a hybrid electric vehicle of claim 2, further comprising:
a variable-pitch propeller; and
a governor configured to control a pitch of the variable-pitch propeller;
wherein the controller is further configured to control the governor responsive to signals received from the control interface.

8. The propulsion system for a hybrid electric vehicle of claim 1, wherein:
the hybrid electric vehicle is an automobile.

9. A propulsion system for a hybrid electric vehicle, further comprising:
a traction motor having first stator windings and second stator windings;
a power source having a first direct current (DC) power output, the power source comprising a generator;
a battery having a second DC power output;
a first inverter electrically coupled between the first DC power output of the power source and the first stator windings;
a second inverter electrically coupled between the second DC power output of the battery and the second stator windings;
one or more hardware processors; and
a non-transitory machine-readable storage medium encoded with instructions executable by the hardware processor to perform operations comprising:
responsive to receiving signals from a control interface, independently controlling:
(i) a first power level of electric power output at the power output of the power source, and
(ii) a second power level of motive power output by the traction motor;
responsive to receiving a signal to set the second power level at less than a full capacity of the traction motor, providing a power difference between the first power level and the second power level from the second stator windings through the second inverter to the battery; and
responsive to the power difference between the first power level and the second power level exceeding a capacity of the battery to absorb power, reducing the first power level of electric power output at the power output of the generator.

10. The propulsion system for a hybrid electric vehicle of claim 9, further comprising:
a control interface, wherein the controller is further configured to independently control the first power level and the second power level responsive to signals received from the control interface.

11. The propulsion system for a hybrid electric vehicle of claim 9, wherein:
the second inverter is a four-quadrant inverter.

12. The propulsion system for a hybrid electric vehicle of claim 9, wherein the power source further comprises:
an engine having a mechanical power output, wherein the generator has (i) an electrical power output and (ii) a mechanical power input, the mechanical power input mechanically coupled to the mechanical power output of the engine; and
a rectifier having (i) an electrical power input electrically coupled to the electrical power output of the generator and (ii) an electrical power output electrically coupled to the DC power output of the power source.

13. The propulsion system for a hybrid electric vehicle of claim 12, wherein:
the engine is a combustion engine.

14. The propulsion system for a hybrid electric vehicle of claim 9, wherein:
the hybrid electric vehicle is an aircraft.

15. The propulsion system for a hybrid electric vehicle of claim 10, further comprising:
a variable-pitch propeller; and
a governor configured to control a pitch of the variable-pitch propeller;
wherein the controller is further configured to control the governor responsive to signals received from the control interface.

16. The propulsion system for a hybrid electric vehicle of claim 9, wherein:
the hybrid electric vehicle is an automobile.

17. A non-transitory machine-readable storage medium encoded with instructions executable by a hardware processor of a computing component, the machine-readable storage medium comprising instructions to cause the hardware processor to perform operations comprising:
responsive to receiving signals from a control interface of a hybrid electric vehicle, independently controlling:
(i) a first power level of electric power output at a direct current (DC) power output of a power source of the hybrid electric vehicle, the power source electrically coupled by a first inverter to first stator windings of a traction motor of the hybrid electric vehicle, the power source comprising a generator, and
(ii) a second power level of motive power output by the traction motor;
responsive to receiving a signal to set the second power level at less than a full capacity of the traction motor, providing a power difference between the first power level and the second power level from second stator windings of the traction motor through a second inverter to a battery of the hybrid electric vehicle; and
responsive to the power difference between the first power level and the second power level exceeding a capacity of the battery to absorb power, reducing the first power level of electric power output at the power output of a generator of the hybrid electric vehicle.

18. The non-transitory machine-readable storage medium of claim 17, wherein:
the hybrid electric vehicle is an aircraft.

19. The non-transitory machine-readable storage medium of claim 18, wherein the operations further comprise:
responsive to the signals received from the control interface, controlling a governor configured to control a pitch of a variable-pitch propeller of the aircraft.

20. The non-transitory machine-readable storage medium of claim 17, wherein:
the hybrid electric vehicle is an automobile.

* * * * *